United States Patent
Ruthstein et al.

(10) Patent No.: US 7,124,158 B2
(45) Date of Patent: Oct. 17, 2006

(54) TECHNIQUE FOR HIGH SPEED PRBS GENERATION

(75) Inventors: Jacob Ruthstein, Petach Tikva (IL); Lev Litinsky, Bat Yam (IL); Ronen Sommer, Givatayim (IL)

(73) Assignee: ECI Telecom Ltd., Petach Tikva (IL)

( * ) Notice: Subject to any disclaimer, the term of this patent is extended or adjusted under 35 U.S.C. 154(b) by 669 days.

(21) Appl. No.: 10/329,581

(22) Filed: Dec. 27, 2002

(65) Prior Publication Data
US 2003/0126168 A1    Jul. 3, 2003

(30) Foreign Application Priority Data
Dec. 27, 2001 (IL) .................... 147359

(51) Int. Cl.
*G06F 7/58* (2006.01)
(52) U.S. Cl. .................... 708/256
(58) Field of Classification Search ............. 708/256
See application file for complete search history.

(56) References Cited

U.S. PATENT DOCUMENTS

| | | | |
|---|---|---|---|
| 5,034,906 A | | 7/1991 | Chang et al. |
| 5,224,165 A | * | 6/1993 | Reinhardt et al. ............ 380/47 |
| 5,257,282 A | * | 10/1993 | Adkisson et al. ........... 708/253 |
| 5,519,736 A | * | 5/1996 | Ishida ....................... 375/367 |
| 5,796,776 A | * | 8/1998 | Lomp et al. ................. 375/222 |
| 6,594,680 B1 | * | 7/2003 | Gu et al. .................... 708/256 |
| 6,735,606 B1 | * | 5/2004 | Terasawa et al. ........... 708/252 |

* cited by examiner

*Primary Examiner*—D. H. Malzahn
(74) *Attorney, Agent, or Firm*—Browdy and Neimark, PLLC

(57) ABSTRACT

A method and a generator are described for high speed generation of an S-bit long pattern of a PRBS sequence to be periodically burst on to a bus of width S. The technique provides the calculation time being independent from the width S of the bus, and comprises calculation of all S bits of the PRBS pattern separately and in parallel by using previous PRBS patterns stored in a memory. For each bit to be generated, the generator performs a constant number N of logical operations require(by a polynomial defining the PRBS sequence.

14 Claims, 2 Drawing Sheets

TECHNIQUE FOR HIGH SPEED PRBS GENERATION

FIELD OF THE INVENTION

The invention relates to a technique for generating Pseudo Random Binary Sequence (PRBS) for a wide bus (the bus having a large number S of binary positions to be transmitted in parallel), i.e. to a method and a device for periodically creating and transmitting a pseudo-random pattern comprising S bits.

BACKGROUND OF THE INVENTION

Creation of a PRBS is usually explained and implemented as applying a polynomial to a binary sequence; it can be illustrated by applying a number of XOR (exclusive OR) operations to a binary shift register.

FIG. 1 shows a simple model for PRBS generation illustrating a shift register 10 comprising one XOR unit 12 which performs a logical operation of exclusive OR with the $11^{th}$ and $9^{th}$ positions of the register to introduce the result in the 0-th position of the register. The output of the register issues a PRBS bit sequence.

The process of forming the bit sequence can be described by the following polynomial having two terms (i.e., w=2, not including the "1"):

$$P = 1 + X^9 + X^{11}$$

According to the above polynomial, each position $a_i$ in the PRBS bit sequence can be formed as follows, using (w−1) XOR operations:

$$a_i = a_{i-9} \oplus a_{i-11}$$

Using indexes $n_j$ of complexity of a polynomial:

$$a_i = a_{i-n_0} \oplus a_{i-n_1}$$

where $n_0=9$, $n_1=11$, we may write down the process of forming a PRBS based on any given polynomial:

$$p = 1 + \sum_{0 \le j < w} x^{n_j}; \quad (1)$$

$$a_i = \bigoplus_{0 \le j < w} a_{i-n_j}$$

As it has been accepted by now, the greater the "w" parameter, the wider the bus (i.e., the greater the number of the "S" parameter), the more complex the PRBS generation process will be from the point of time and memory consumption.

The above statement could be explained by the fact that, for forming any next binary position of the PRBS sequence, some particular previous binary positions of the PRBS sequence should be used. Based on the conventional model of the PRBS generation, one cannot calculate a following position of the PRBS sequence before the required previous positions of the sequence become known. However, the previous positions are also to be calculated based on some pre-previous positions of the PRBS stream. Consequently, if all S positions of a rather long pattern of PRBS sequence is to be created during one and the same generator's clock, this clock would most probably include a considerable number of iterative calculations (and a chain of XORs in the implementation) which means that a high speed clock is hardly achievable for wide buses.

In case the PRBS sequence be wholly stored in the memory, so that patterns of the sequence be issued just by reading them from the memory one after another, the memory would be excessively large since the periodicity of a complex PRBS pattern is quite great and is equal to $2^K - 1$, where $K = n_{w-1}$.

U.S. Pat. No. 5,034,906 describes a system for synchronizing a pseudorandom binary sequence signal with a time-delayed version of the same signal without the use of delay lines or programmable counters. This is accomplished by the use of two Pseudorandom Binary Sequence [PRBS] generators for producing the same PRBS signal. Each PRBS generator incorporates as a constituent component a serial shift register with M stages with the outputs of multiple stages fed back through can exclusive-OR to provide an input to the register, thereby to produce a clocked repetitive series of said sequence signal as inputs to each register. The states of shift register are numbered n such that (n−1) clock cycles elapse before the next start state. A start detect circuit is responsive to the start state of the pseudorandom binary sequence signal of the first generator for generating a synchronizing signal at that instant to force the second PRBS generator to be at a state in the binary sequence representing a delayed point in the sequence.

The solution of U.S. Pat. No. 5,034,906 is focussed on synchronizing the sequence. It should be mentioned, however, that the principle of a serial shift register does not allow obtaining a high speed wide bus PRBS generator.

OBJECT OF THE INVENTION

The main object of the invention is to achieve generation of quite a wide (S-bit long) pattern during a minimal "time clock" of the generator, i.e. to provide a method and a device for high speed PRBS generation. An additional object of the invention is to provide a high speed PRBS generator with effective capacity of the memory.

SUMMARY OF THE INVENTION

The Inventors propose a novel solution of a high speed PRBS generator for a wide bus having width S (i.e., a parallel generator of S-long PRBS patterns) which is capable of performing calculations required for preparing an S-long PRBS pattern without any iterations, i.e., enables obtaining all bits of the PRBS pattern in parallel by performing for each bit a constant number N of logical operations according to a given polynomial, thus achieving the shortest possible clock period of the generator.

The term "PRBS pattern" is used for defining a part of a PRBS sequence to be calculated and transmitted in parallel.

Keeping in mind the facts that the pattern is calculated per bit, that the process is parallel, and that the number N of logical operations required for each bit of the pattern is constant, one may conclude that the complexity of processing is independent from the length S of the pattern (or from the width S of the bus).

Preferably, this constant number N is the minimal number of operations required by the given polynomial.

Speaking exactly, if the number of members of the given polynomial is w, the minimal number of logical operations (XORs) to be performed per bit of the pattern is equal to w−1. The minimal clock will be therefore limited by w−1 XOR operations. The total minimal number of XOR circuits for the pattern will be S(w−1).

It should be mentioned, however, that the XOR operations do not have to be performed in sequence, i.e., in most cases some of them may be done in parallel. Therefore, the minimal time for per-bit calculation, measured in XORs (time for performing one XOR operation) is O(log w) where O is constant.

The Inventors have therefore found that the high speed PRBS generator can be built if, per one bit of the S-bit long PRBS pattern, there is used a group of devices comprising the constant (and even a minimal number "w−1") of XORs, and if all S groups of XORs are operative simultaneously, thus providing for a shortened (and even the minimal) time clock.

For implementing the above-proposed generator, its memory is to be built as a number of S-long registers for storing previously issued PRBS patterns, and should be used in a special manner.

The Inventors proved a Lemma which allows converting the expression (1) for creating a PRBS pattern based on a given polynomial, into a form which enables avoiding iterative calculations of bits of the PRBS by effectively utilizing the memory.

The Lemma states:

$$a_i = \bigoplus_{0 \leq j < w} a_{i-n_j} \Rightarrow a_i = \bigoplus_{0 \leq j < w} a_{i-2^t \cdot n_j} \qquad (2)$$

The Lemma can be proven by induction as follows:

For t=0:

$$a_i = \bigoplus_{0 \leq j < w} a_{i-2^0 \cdot n_j} = \bigoplus_{0 \leq j < w} a_{i-n_j}$$

Assumption for t: $\quad a_i = \bigoplus_{0 \leq j < w} a_{i-2^t \cdot n_j}$ step to $z = t+1$: $\quad a_i = \bigoplus_{0 \leq j < w} a_{i-2^z \cdot n_j}$ $$a_{i-2^t \cdot n_j} = \bigoplus_{0 \leq k < w} a_{(i-2^t \cdot n_j)-2^t \cdot n_k} = \bigoplus_{0 \leq k < w} a_{i-2^t \cdot n_j - 2^t \cdot n_k}$$

$$a_i = \bigoplus_{0 \leq j < w} \bigoplus_{0 \leq k < w} a_{i-2^t \cdot n_j - 2^t \cdot n_k} = \underbrace{\bigoplus_{0 \leq j < w} \bigoplus_{k=j} a_{i-2^t \cdot n_j - 2^t \cdot n_k}}_{I} \oplus \underbrace{\bigoplus_{0 \leq j < w} \bigoplus_{0 \leq k \neq j < w} a_{i-2^t \cdot n_j - 2^t \cdot n_k}}_{II}$$

$$I = \bigoplus_{0 \leq j < w} a_{i-2^t \cdot n_j - 2^t \cdot n_j} = \bigoplus_{0 \leq j < w} a_{i-2^{t+1} \cdot n_j} = \bigoplus_{0 \leq j < w} a_{i-2^z \cdot n_j}$$

$$II = \bigoplus_{0 \leq j < w} \bigoplus_{j < k < w} a_{i-2^t \cdot n_j - 2^t \cdot n_k} \oplus \underbrace{\bigoplus_{0 \leq j < w} \bigoplus_{0 \leq k < j} a_{i-2^t \cdot n_j - 2^t \cdot n_k}}_{III}$$

$$III = \bigoplus_{0 \leq k < w} \bigoplus_{j < k < w} a_{i-2^t \cdot n_j - 2^t \cdot n_j} \underset{k \leftrightarrow j}{=} \bigoplus_{0 \leq j < w} \bigoplus_{k < j < w} a_{i-2^t \cdot n_j - 2^t \cdot n_j}$$

$$II = \bigoplus_{0 \leq j < w} \bigoplus_{j < k < w} a_{i-2^t \cdot n_j - 2^t \cdot n_k} \oplus \bigoplus_{0 \leq j < w} \bigoplus_{j < k < w} a_{i-2^t \cdot n_j - 2^t \cdot n_k} =$$

$$= \bigoplus_{0 \leq j < w} \bigoplus_{j < k < w} a_{i-2^t \cdot n_j - 2^t \cdot n_k} \oplus a_{i-2^t \cdot n_j - 2^t \cdot n_k} = 0$$

$$a_i = \bigoplus_{0 \leq j < w} a_{i-2^z \cdot n_j} \oplus 0 = \bigoplus_{0 \leq j < w} a_{i-2^z \cdot n_j}$$

The meaning of the Lemma is that instead of sequentially calculating every bit of a PRBS pattern using previous bits of this same pattern, one may perform separate calculation of each bit of the pattern based on "pre-previous" bits of the PRBS pattern, if stored in a memory. The degree of retro-action is measured by the power "t" (retrospective index); it can be selected so that all bits of the current PRBS pattern, including those requiring the longest history, be formed using the memory.

However, different "t" values can be selected for calculating different bits of the current PRBS pattern, and that finding can be utilized for minimizing the required memory capacity.

In other words, for the S-bit PRBS pattern built for a S-width bus B:

$$b_i = \sum_{0 \le j < w}^{\oplus} M_{i-2^t n_j} \qquad (3)$$

where $b_i$—is a running bit of the bus B comprising ($b_0, b_1, \ldots b_i \ldots B_{S-1}$)

$M_i$—is a running bit of memory M; it has a negative index expressing how old is the memory bit regarding to the corresponding current bit of the PRBS pattern created on the bus;

t—is a retrospective index selected so as to find the bit ($2^t n_j$), ready in the memory, for a specific bit $b_i$ of the current PRBS pattern.

Keeping in mind, that the memory comprises a number of S-long registers for storing previous issued PRBS patterns, it can be further clarified that any current created PRBS pattern is shifted, in parallel, into the memory and in the memory, which fact can be written down as follows:

$$M_i = \begin{vmatrix} b_{i+s} & \text{if } i \ge -s \\ M_{i+s} & \text{if } i < -s \end{vmatrix} \qquad (4)$$

Moreover, the Inventors estimated the effective capacity of the PRBS generator's memory based on the required length S of the pattern, value of "t" and complexity of the polynomial which is expressed by the parameter $n_j$.

It has been found that the minimal value of "t" sufficient for forming any bit of the S-bit PRBS pattern by parallel calculation of all the bits (when one and the same "t" is used) will be:

$$t_m = \left\lceil \log_2 \frac{s}{n_0} \right\rceil \qquad (5)$$

where $n_{w-1} > n_{w-2} > \ldots > n_0$

Since the term of the polynomial having the complexity index $n_{w-1}$ requires the most "deep" use of the memory, the memory capacity (in bits) C can be calculated as follows:

$$c = 2^{t_m} \cdot n_{w-1} = 2^{\left\lceil \log_2 \frac{s}{n_0} \right\rceil} \cdot n_{w-1} \qquad (6)$$

The Inventors have shown that since different "t" values can be used for calculating different bits of the PRBS, the memory capacity can be further reduced:

$$c' = 2^{t_m} \cdot n_{w-1} - 2^{t_m - 1} = c - 2^{t_m - 1} \qquad (7)$$

Indeed, not all bits of the PRBS pattern require the same depth of the memory; for example, for bit $b_0$ the minimal t=0 can be used, i.e. the previous PRBS pattern just stored in the memory.

BRIEF DESCRIPTION OF THE DRAWINGS

The invention can be better understood with the aid of the following non-limiting drawings in which.

DESCRIPTION OF PREFERRED EMBODIMENTS

Figure 1:
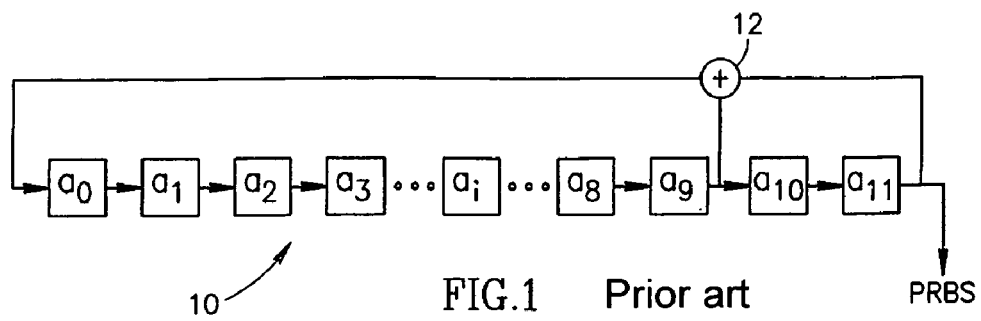
FIG. 1 illustrates a conventional model for obtaining a PRBS sequence
Figure 2:
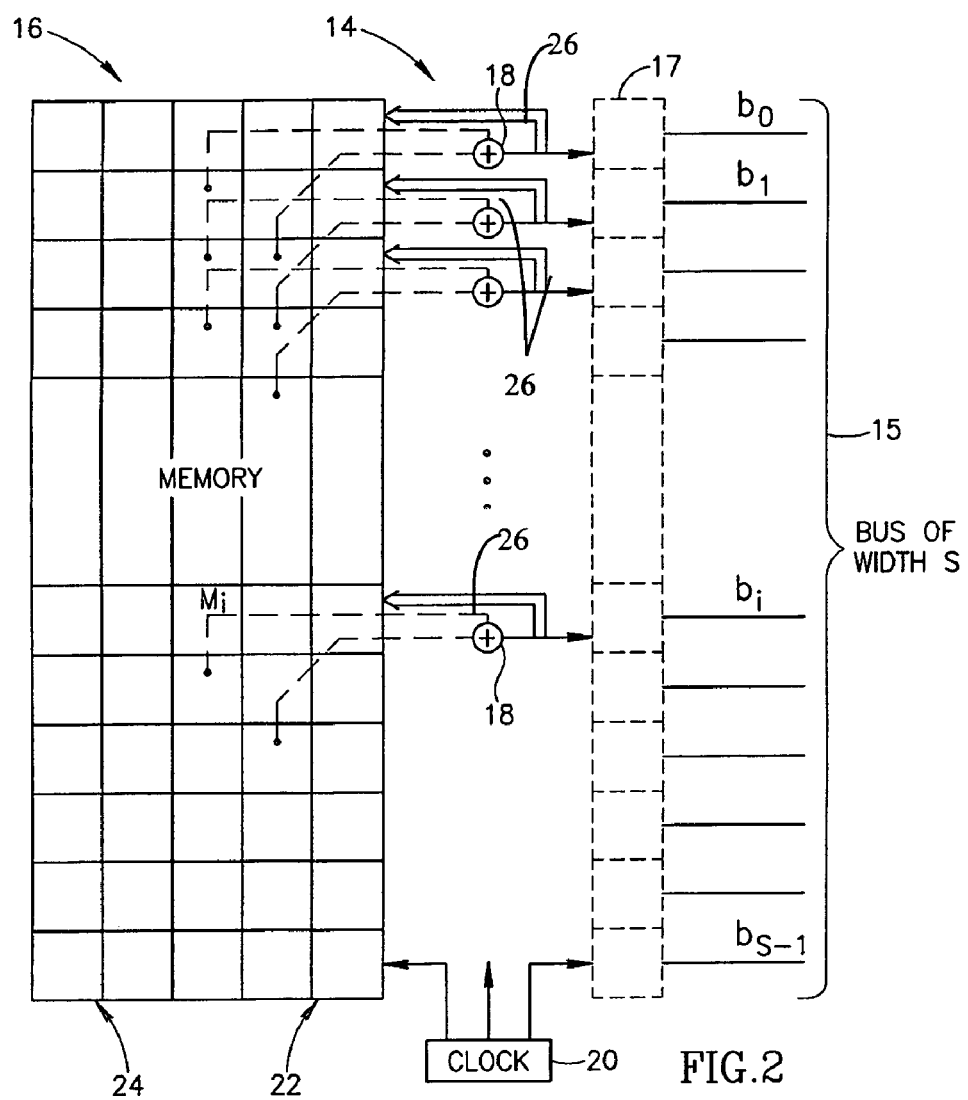
FIG. 2 illustrates a schematic block diagram of one embodiment of the proposed PRBS generator FIG. 3 gives an illustrative example of obtaining a PRBS pattern for an S-wide bus using the generator shown in FIG. 2.

FIG. 2 illustrates a schematic block-diagram of one embodiment of the PRBS generator 14 according to the invention, which also explains the proposed method.

The generator 14 comprises a memory 16 and is connected to an S-bit wide bus 15 to create on it a PRBS pattern in the form of a parallel burst of bits. For synchronizing purposes only, a register 17 can be added between the generator and the bus. Each bit of the bus 15 is calculated using the memory 16 and an assembly 18 of logical units performing XOR operations and associated with a particular bit of the bus. There are S such assemblies capable of working in parallel, and they form part of the generator 14. In the drawing, each assembly 18 comprises only one XOR unit; it should be understood that more complex assemblies will be used if a more complex polynomial is given for creating the required PRBS pattern.

The memory 16 comprises a plurality of registers, capable of performing parallel shift from the top register 22 to the direction of the bottom register 24. Each of the registers stores a particular PRBS pattern (a part of the PRBS sequence); the "freshest" pattern is introduced in the memory upon completing its calculation (see arrows 26) and simultaneously with bursting it on to the bus 15, while the "oldest" pattern is erased from the bottom pattern 24 due to feeding there-into a "fresher" pattern from the adjacent register. The process is controlled by a clock 20.

For calculating a specific bit of a PRBS pattern, the corresponding assembly 18 uses particular bits in the memory which are located in previous PRBS patterns. The required memory bits for each particular PRBS bit (bit of the bus) can be found using the Lemma, equation (3) and upon selecting the retrospective index "t":

$$b_i = \sum_{0 \le j < w}^{\oplus} M_{i-2^t \cdot n_j} \qquad (3)$$

The calculations are performed in parallel, using one and the same number of logical operations (which is preferably minimal and equals to w−1), due to that the calculation time is independent from the length of the pattern (i.e., from the width of the bus). Results of the S parallel calculations are synchronously fed to the bus 15, and simultaneously and synchronously "shifted back" to respective bits of the register 22.

Figure 3:
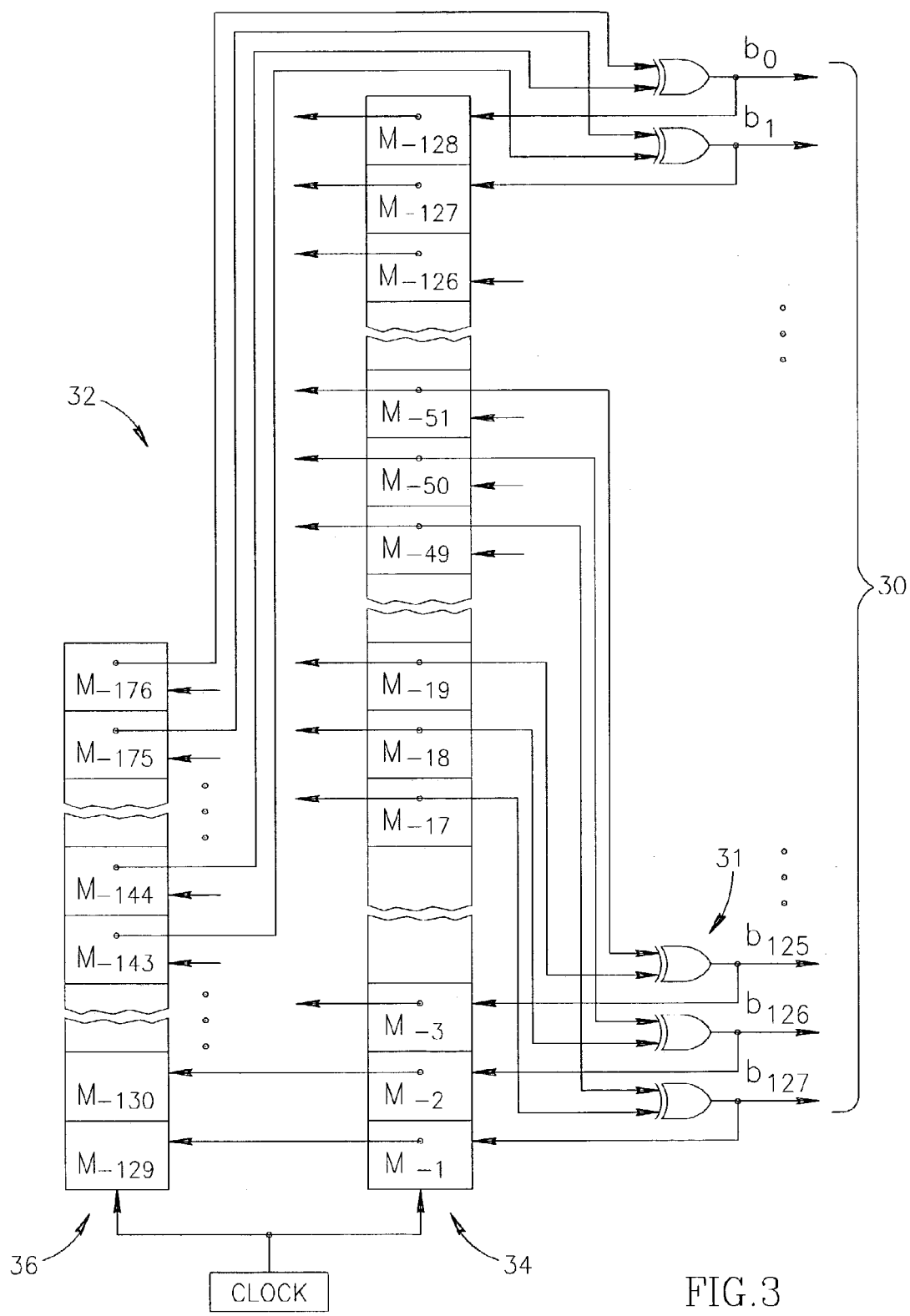

FIG. 3 shows how a PRBS sequence $1+X^9+X^{11}$ can be obtained by the described generator. In this example, the bus width S=128. Positions 30 of the bus $b_0, b_1, \ldots b_{127}$, whenever obtained by logical XOR assemblies 31, are transmitted over the bus and, at the same time clock, are shifted in parallel back to the memory 32. Positions of the top register 34 of the memory are indicated as $M_{-128}$, $M_{-127}, \ldots, M_{-2}, M_{-1}$ to express their previous state in time with respect to respective positions of the bus. At the next clock, contents of the top register 34 of the memory are shifted into the next register 36.

Using formula (5), the minimal value of the retrospective index $t_m$ can be calculated: $t_m = \log_2 (128/9) = 4$.

Then, using formula (6), capacity C of the memory can be calculated as follows: $C = 2^4 * 11 = 176$.

It can be seen that for creating the required PRBS pattern for quite a wide bus (S=128), only 176 bits of memory are needed i.e., one complete register of 128 bits, and a second incomplete one. For creating this PRBS pattern in a conventional way, a much greater memory would be required.

As has been mentioned, each bit of a particular PRBS pattern is calculated:
based on a given polynomial having "w" members,
independently from calculating other bits of the particular PRBS pattern, and
using a constant number N of logical operations of exclusive OR, thereby enabling parallel calculation of all S bits of the particular PRBS pattern.

In this embodiment, keeping in mind that:
in the given polynomial we have two terms (w=2); $n_j$ takes two values equal to 11 and 9 respectively; and that N=1, we obtain particular positions of the PRBS pattern on the bus, using formula (3):

$$b_0 = M_{(0-16*11)} \oplus M_{(0-16*9)} = M_{(-176)} \oplus M_{(-144)}$$

...

$$b_{127} = M_{(127-176)} \oplus M_{(127-144)} = M_{(-49)} \oplus M_{(-17)}.$$

While the present invention has been described with reference to one particular example, it should be appreciated that other versions of the method and other implementations of the PRBS generator can be proposed based on the disclosed concept, which should all be considered part of the present invention.

The invention claimed is:

1. A method for high speed generating an S-bit long pattern of a PRBS sequence, to be periodically burst on to a bus of width S, the method comprising:
calculating all S bits of a new S-bit long PRBS pattern separately and in parallel, said step of calculating comprising:
using previously generated PRBS patterns stored in a memory; and
performing, for each bit to be generated, one and the same number N of logical operations required by a given polynomial, so that the calculation time is independent from the width S of the bus, wherein:
S- is an integer being equal to a number of bits in a PRBS pattern and to the width of the bus measured in bits;
N—is an integer being no less than the minimal number w−1 of logical operations "exclusive OR" (XOR), where w is the number of terms in the given polynomial.

2. The method according to claim 1, wherein the number N of logical operations is the minimal number of logical operations "exclusive OR" (XOR) being equal to w−1, where w is the number of terms in the given polynomial.

3. The method according to claim 1, wherein the minimal time required for calculation the PRBS pattern is O(logw), where w is the number of terms in the given polynomial and O is constant.

4. The method according to claim 1, wherein the step of calculating comprises:
for each bit of the new PRBS pattern to be calculated and currently fed on to a corresponding bit of the S-width bus, using bits of the previously generated PRBS patterns stored in the memory, calculating each bit of the new PRBS pattern according to the following equation:

$$b_i = \sum_{0 \le j < w}^{\oplus} M_{i-2^t \cdot n_j}, \quad (3)$$

where
w—is the number of terms in the given polynomial;
$b_i$—running number of a bit of the S-width bus and of a corresponding bit of the new PRBS pattern;
$M_1$—running number of a bit of the memory;
t—retrospective index, for choosing an appropriate bit of a previously generated PRBS pattern stored in the memory;
$n_j$—index of complexity of the given polynomial.

5. The method according to claim 4, comprising selecting different retrospective indexes t for calculating different bits of the bus.

6. A generator for generating an S-bit long pattern of a PRBS sequence to be periodically burst on to a bus of width S. the generator comprising;
a memory;
a logic circuit capable of obtaining all bits of a new-S-bit long PRBS pattern separately and in parallel by using previously generated PRBS patterns stored in the memory and performing for each bit of the new pattern to be generated one and the same number N of logical operations required by a given polynomial, thus achieving a shortened clock period of the generator, being independent from the width of the bus, wherein:
S- is an integer being equal to a number of bits in a PRBS pattern and to the width of the bus measured in bits;
N—is an integer being no less than the minimal number w−1 of logical operations "exclusive OR" (XOR), where w is the number of terms in the given polynomial.

7. The generator according to claim 6, wherein the memory comprises a plurality of shift registers for respectively storing the previously successively generated S-bit PRBS patterns;
the plurality of shift registers comprising a bottom register and a top register connected to the bus, and being capable of parallel shifting of information upon introducing a "freshest" PRBS pattern into the top register from the bus, so that an "oldest" PRBS pattern is erased from the bottom register of the memory; wherein the the logic circuit comprises:

S sets of N XOR means for obtaining the new S-long PRBS pattern, wherein said N XOR means is provided per each particular bit of said new PRBS pattern to be fed to the bus, for creating the value of said particular bit based on bits of the previous PRBS patterns stored in the memory; and a clock for synchronizing operation of the XOR means of all the bits thereby obtaining said new PRBS pattern, transmitting it via the bus and shifting it into the top register of the memory.

8. The generator according to claim 6, wherein the number N is the minimal number being equal to w−1, where w is the number of terms in the given polynomial.

9. The generator according to claim 6, wherein said stored bits are respectively selected for each bit of the S-width bus according to the following equation:

$$b_i = \sum_{0 \leq j < w}^{\oplus} M_{i-2^t \cdot n_j}, \qquad (3)$$

where
w—is the number of terms in the given polynomial;
$b_i$—running number of a bit of the S-width bus and of a corresponding bit of the new PRBS pattern;
$M_i$—running number of a bit of the memory;
t—retrospective index, for choosing an appropriate bit of a previously generated PRBS pattern stored in the memory;
$n_j$—index of complexity of the given polynomial.

10. The generator according to claim 9, wherein different retrospective indexes t are selected for calculating different bits of the bus.

11. The generator according to claim 6, wherein capacity C of the memory is selected according to the following formula:

$$c = 2^{t_m} \cdot n_{w-1} \qquad (6)$$

wherein
w—is the number of terms in the given polynomial;
t—retrospective index, for choosing an appropriate bit of a previous PRBS pattern in the memory;
$n_j$—index of complexity of the given polynomial $t_m$—is the minimal retrospective index calculated according to:

$$t_m = \left\lceil \log_2 \frac{s}{n_0} \right\rceil. \qquad (5)$$

12. The generator according to claim 11, wherein different retrospective indexes t are selected for calculating different bits of the bus, and wherein capacity C' of the memory is selected as follows:

$$c' = c - 2^{t_m - 1}. \qquad (7)$$

13. A method for high speed generating an S-bit long pattern of a PRBS sequence, the method comprising the following steps:

preliminarily storing, in a memory, a number of previous successively generated S-bit long PRBS patterns in the order of their generation, and performing parallel shift of the stored information upon introducing a freshest PRBS pattern into the memory;

creating, separately and in parallel, each of S bits of a new S-long PRBS pattern, so that each particular bit of said new PRBS pattern is obtained based on a given polynomial and by applying one and the same number N of logical operations to specific bits of the previous PRBS patterns stored in the memory;

synchronizing said N logical operations performed for obtaining different bits of the new S-long PRBS pattern, to generate all the bits of said pattern simultaneously, and issuing the generated new S-long PRBS pattern and storing said pattern in the memory as the freshest PRBS pattern, wherein:

S- is an integer being equal to a number of bits in a PRBS pattern;

N—is an integer being no less than the minimal number w−1 of logical operations "exclusive OR" (XOR), where w is the number of terms in the given polynomial.

14. A generator for generating an S-bit long pattern of a PRBS sequence to be periodically burst on to a bus of width S, the generator being capable of calculating S bits of a new S-bit long PRBS pattern separately and in parallel by using previous successively generated S-bit long PRBS patterns; the generator comprises:

a memory including a plurality of shift registers for respectively storing the previous successively generated S-bit long PRBS patterns; the plurality of shift registers comprises a bottom register and a top register and is capable of performing parallel shift of information there-between upon introducing a freshest PRBS pattern into the top register;

S sets of N logical means for generating the new S-long PRBS pattern, wherein each of said sets are capable of generating a particular bit of said new PRBS pattern based on a given polynomial by applying N respective logical operations to specific bits of the previous successively generated S-bit long PRBS patterns stored in the memory;

a clock for synchronizing operation of all said logical means for simultaneously generating all bits of said new S-long PRBS pattern; and means for transmitting the generated new S-long PRBS pattern to the bus, and for storing said pattern in the memory as the "freshest" PRBS pattern, wherein:

S- is an integer being equal to a number of bits in a PRBS pattern and to the width of the bus measured in bits;

N—is an integer being no less than the minimal number w−1 of logical operations "exclusive OR" (XOR), where w is the number of terms in the given polynomial.

* * * * *